United States Patent [19]

Verdier

[11] 4,027,712

[45] June 7, 1977

[54] TIRE FILLED WITH LUBRICANT COATED CELLULAR PARTICLES

[75] Inventor: Henri Verdier, Beauregard-l'Eveque, France

[73] Assignee: Compagnie Generale des Etablissements Michelin, raison sociale Michelin & Cie, France

[22] Filed: June 6, 1975

[21] Appl. No.: 584,335

Related U.S. Application Data

[62] Division of Ser. No. 535,699, Dec. 23, 1974.

[30] Foreign Application Priority Data

Dec. 21, 1973 France .............................. 73.46442

[52] U.S. Cl. .............................. 152/311; 152/347; 152/415; 141/38
[51] Int. Cl.[2] .................... B60C 7/12; B60C 17/00; B60C 21/08; B60C 29/00
[58] Field of Search .................. 152/415, 310–314, 152/316, 318, 346–348; 141/8, 10, 28, 38, 59

[56] References Cited

UNITED STATES PATENTS

| 806,095 | 12/1905 | Barrow | 141/59 |
|---|---|---|---|
| 1,413,772 | 4/1922 | Paulsen | 141/59 |
| 1,842,134 | 1/1932 | Waite | 141/59 |
| 2,349,594 | 5/1944 | McMahan | 141/38 |
| 2,434,991 | 1/1948 | Crowley | 141/38 |
| 2,991,629 | 7/1961 | Rose | 141/38 |
| 3,843,586 | 10/1974 | Wolf | 141/38 |

*Primary Examiner*—Drayton E. Hoffman
*Attorney, Agent, or Firm*—Brumbaugh, Graves, Donohue & Raymond

[57] ABSTRACT

A tire has its tire cavity filled with inexpensive lubricated light cellular particles and thereby avoids deformation and flattening of the tire upon loss of inflation pressure while maintaining vehicular control.

10 Claims, 5 Drawing Figures

TIRE FILLED WITH LUBRICANT COATED CELLULAR PARTICLES

This is a division of application Ser. No. 535,699 filed Dec. 23, 1974.

The present invention relates to improvements in tires. More particularly, it concerns means intended to avoid the deformation and flattening of tires and the destruction or decrease in efficiency of them which results therefrom when the pressure inside the tire cavity becomes insufficient.

The known devices of greater or lesser effectiveness, such as flexible linings or treads arranged on the inside of the tire cavity, show a number of drawbacks, the main ones being their weight and therefore sensitivity to centrifugal force and the development of imbalance; the resistance to travel; the difficulties of implacement; and the high cost.

The object of the present invention is to overcome these drawbacks by providing a means which makes it possible to maintain control of the vehicle, which is very light, is easy to put in place and is inexpensive.

The tire in accordance with the present invention, mounted with or without an inner tube on a wheel rim so as to form a tire cavity which can be inflated with a gas under pressure, is characterized by the fact that the tire cavity is filled at least partially with solid particles of cellular material of very low apparent density but resistant to the stresses due to tire travel, these particles bearing a lubricant which is inert with respect to the materials present in the tire cavity.

By "apparent density" there is understood not the density of the material of which the particles are formed but the density of the particles expressed in $g/dm^3$.

The invention relates to the use of particles of any shape or mixtures in all proportions of such particles whatever the law of distribution of the dimensions or shapes of the particles in the components of the mixture. The invention also relates to the use of mixtures of particles such that the particles of at least one of the components of the mixture are formed of a cellular material which is different from the material constituting the particles of the other component or components of the mixture. It is advantageous to use particles of rounded shape when they are easily available.

As material constituting the particles any known material or material which becomes known in the future may be used provided that it satisfies the general definition given above. In the present state of knowledge, preference is given to the organic cellular polymers, for instance cross linked or un-cross linked polyolefins, such as polyvinyl chlorides, polyethylenes, polypropylenes and their derivatives including the copolymers of styrene such as the acrylics, as well as the cellular rubbers; polyurethanes; polyesters; derivatives of cellulose; foams of polyvinyl alcohol and formaldehyde; phenolic and epoxy resins; urea-formaldehyde resins; polyimides; polyamides; fluorinated polymers; polycarbonates; polyvinyl carbazoles; pyranyl foams from acrolein; phenylene polyoxides and polysulfones. Among them, expanded polystyrene is particularly suitable. However, the inorganic polymers such as the silicones or the inorganic foams having a base of glass are also suitable, as are also cellular metal alloys of very low apparent density having a base of aluminum, magnesium and beryllium, and the cellular refractory materials of very low apparent density.

Satisfactory results have been obtained with particles which withstand a gas pressure of at least 2 bars, are stable in shape up to a temperature of about 80° C., are in the shape of spheres whose diameter, depending on the material selected, is between about 1 mm. and about 8 mm. and have an apparent density of less than about 100 $g/dm^3$ and preferably of the order of 15 $g/dm^3$ before the lubricant is added.

It is furthermore advantageous to use particles whose dimensions satisfy a particle size distribution which varies within rather wide limits. The purpose of this is to have a certain content of particles of relatively small dimensions capable of plugging a possible hole in the tire, for instance as a result of the penetration of a nail. These particles are then drawn into the hole and assure at least the temporary air tightness of the tire cavity.

The lubricant which is inert with respect to its environment whatever the temperature, may for instance be fluid and/or solid or else become fluid only when a given temperature is reached within the tire, for instance when the tire cavity has suffered a decrease in pressure. It is moreover advantageous to use a lubricant of high thermal conductivity which preferably increases with temperature so as to achieve heat exchange between the hottest element and the coldest element with which the particles enter into contact. It is also advantageous to combine such a lubricant with solid particles of one or more cellular materials whose thermal conductivity increases with the temperature prevailing within the tire cavity.

Moreover, it is advantageous to use a lubricant which in liquid state has a low vapor tension such that under the effect of the increase in temperature of the tire the pressure prevailing in the tire enclosure increases as the lubricant evaporates. This may occur for instance as a result of a decrease in the inflation pressure resulting from a leak caused in the tire cavity or very simply in case of prolonged driving of the tire at high speed. The use of such a lubricant, borne by the particles introduced into the tire, even in small amount, therefore makes it possible to avoid taking the precaution of slightly overinflating the tire before starting a long trip at high speed, for instance on a super highway. As a matter of fact, this recommended additional inflation pressure will be produced by the evaporation of the lubricant in the tire. Along this line, it is also advantageous to use a lubricant formed of a mixture of a volatile liquid and a liquid of high boiling point.

Among the lubricants which are satisfactory, mention may be made of the polyglycol ethers and their derivatives, obtained generally by the action of ethylene oxide on compounds having one or more free hydrogen atoms, such as the alkyl phenols, the fatty alcohols and the fatty acids. The preferred lubricants are the polyethylene glycols and the polypropylene glycols. Water can also be used, possibly mixed with another lubricant, in view of its low vapor tension. The above-mentioned lubricants may advantageously be combined with solid lubricants such as graphite, molybdenum disulfide or talc.

It goes without saying that in regions of the earth where the temperature may be low and if the lubricant used is a liquid lubricant, it is advisable to select it with such characteristics that it does not freeze at the lowest temperatures which may be reached. In view of the foregoing, the preferred lubricant should have a low freezing point, an appreciable cold vapor tension and a low heat of evaporation, so that the lubricated particles do not agglomerate when the tire is at a standstill.

When the tire is in normal state, the lubricated particles distribute themselves uniformly along the tire cavity of toroidal shape without forming any accumulation which could result in an imbalance. The particles themselves support the deformations upon tire travel, do not interfere with each other and do not interfere with the deformations of the tire. The cost of the lubricated particles is remarkably low in view of the negligible total amount of particles used to fill a tire cavity. Likewise, the amount of lubricant used may be very small in view of the volume of the support consisting of the particles.

The invention contemplates the introduction of the particles into the tire cavity before or after they have been coated with the lubricant.

The extreme lightness of the particles makes their introduction into the tire cavity astonishingly easy, provided that one limits oneself to particles of suitable size. For this purpose, a particle filling orifice is provided, on the one hand, on the tire cavity, said orifice abutting—when the tire, of course, is mounted—a tube which extends into a receptacle filled with particles. On the other hand, a vacuum-producing device known as a tube evacuator is mounted on the inflation valve of the tire cavity. When the tube evacuator is placed into action, the particles, due to their lightness, are transferred by suction from the receptacle into the tire cavity. Of course, a means to prevent the particles from emerging from the tire cavity during the filling thereof is provided. When the suitable quantity of particles has been transferred, the action of the tube evacuator is stopped, the tube is removed from the filling orifice and the orifice is hermetically plugged. It is now merely necessary to inflate the tire cavity to the pressure of use of the tire. Such a filling can be effected even by an unskilled person, on a new tire as well as on an old tire, for instance after repair of a flat.

As a variant, the inflation valve can also be used to introduce the particles into the tire cavity.

Another possibility of introducing particles into the tire cavity when the latter does not contain an inner tube consists first of all in filling one or more bags formed of a film of flexible and preferably heat fusible material with said particles and then putting said bag or bags in the tire cavity during the mounting of the tire on the rim. In order to prevent the bag or bags from moving in the tire cavity, cementing to the inner wall of the tire, for instance in the region of the tread thereof, can be effected.

This method of introduction may be used whatever the type of wheel rim. However, it is particularly advantageous in the event that the rim has a tire mounting groove adjoining the rim flange located on the outer side with respect to the vehicle and which is plugged after the tire has been put in place.

Such a rim is described for instance in U.S. patent application Ser. No. 489,106 (now U.S. Pat. No. 3,884,286). The advantage of using one or more bags with this type of rim is that it is not necessary to provide the rim with an orifice particularly intended to permit the introduction of the particles into the tire cavity, as for instance when using the suction filling process described above.

The bag (or each of the bags) provided in accordance with the invention in order to contain the particles is of preferably circular cross section with a diameter substantially equal to the largest dimension of the tire cavity. The length of this bag or the total length of the bags corresponds substantially to the mean circumferential length of the tire cavity.

The flexible material of which the bag or bags is made is, for instance, a copolymer of ethylene and vinyl acetate in the form of a film, or any other material of low softening point (for instance, about 65° C. or less) as defined in French Standard NF T-51-021 or in the American ASTM D 1525 65 T. There are preferred films whose thickness is not more than about 40μ formed of combinations of low density polyethylene and thermoplastic sytrene-butadiene-styrene block copolymers, these films having the advantage that they can be handled easily due to their good mechanical and elastic properties at ambient temperature.

When the above-mentioned softening point is reached during the travel of the tire, the bag containing the particles softens and then melts so that the particles enter directly into contact with the inner wall of the tire. If the latter has accidentally lost all or part of the inflation air, the driving can continue in normal manner.

The accompanying drawing and its description will facilitate an understanding of the invention. In this drawing, by way of illustration and not of limitation:

Figure 1:
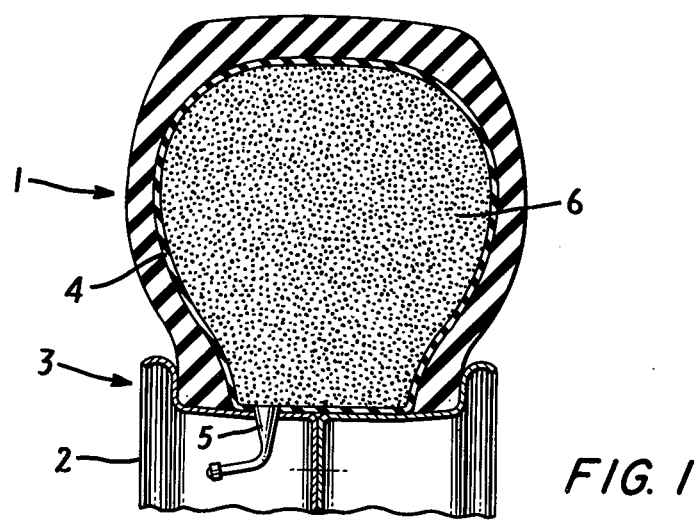
FIG. 1 is a radial section view of a tire in which there is contained an inner tube filled with a charge of particles in accordance with the invention.

Referring to FIG. 1, a tire 1 is mounted on the rim 2 of a wheel 3. This tire 1 has an inner tube 4 provided with an inflation valve 5.

In accordance with the invention the tire cavity defined here by the inner tube 4 contains solid particles 6 of cellular material which bear a lubricant. In this example, the inner tube is completely filled with such particles.

Figure 2:
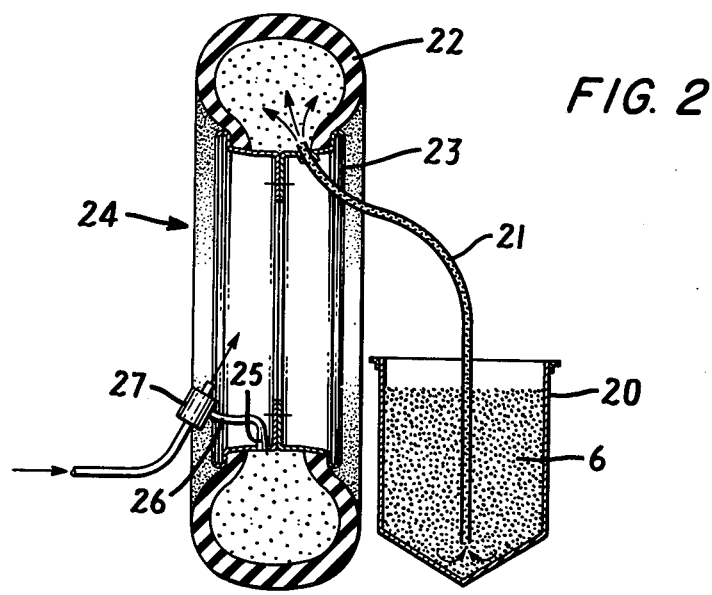
FIG. 2 is a section view of a tire mounting comprising a device for filling a tire in accordance with the invention.

A device for filling a tire cavity with particles in accordance with the invention is shown schematically in FIG. 2. This device comprises a receptable 20 containing particles 6 into which there extends one end of a tube 21, the other end of which is connected to the tire 22 mounted on the rim 23 of a wheel 24. This connection is effected in airtight manner through the wall of the rim 23. A vacuum-producing device 27 of the type known as a tube evacuator is connected by a hose 26 to an inflation valve 25 which is firmly connected with the rim. This device is traversed by a stream of air under pressure and has the effect of aspirating the air contained in the tire 22. As the pressure decreases in the tire, the particles 6 contained in the receptacle 20 are drawn into the tube 21 and fill the tire. The filling ceases as soon as the flow of air under pressure in the device 27 is interrupted.

When the desired degree of filling has been reached, the tube 21 is withdrawn from the rim 23, the corresponding orifice in the rim is closed by a suitable plug, for instance a threaded plug, whereupon the air suction device 26, 27 is disconnected from the valve 25 and a source of compressed air is connected to said valve thereby inflating the tire 22 in customary manner up to the desired pressure.

A variant of this method of filling consists in using an airtight receptacle 20 which contains a supply of particles and causing air under pressure to act on the particles. The tube evacuator 27 being eliminated and the valve 25 being open, the excess pressure thus established transfers the particles into the tire cavity.

The wheel equipped with the tire which has thus been filled and inflated can then be mounted on the vehicle.

Figure 3:
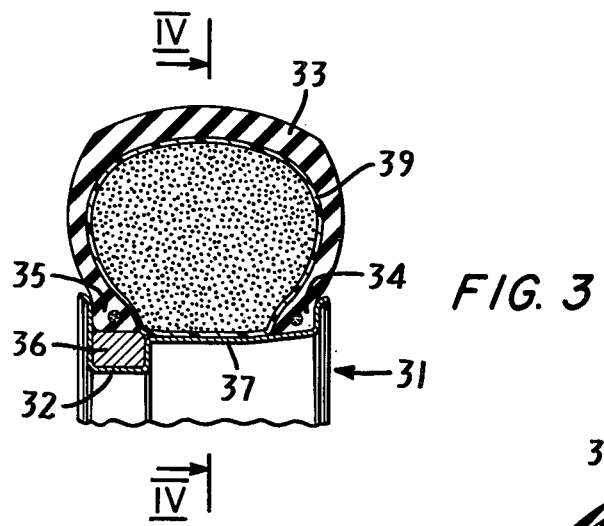
FIG. 3 is a radial section view of a tire mounted on a wheel rim with a plugged mounting groove adjacent to one of the flanges of said rim.
Figure 4:
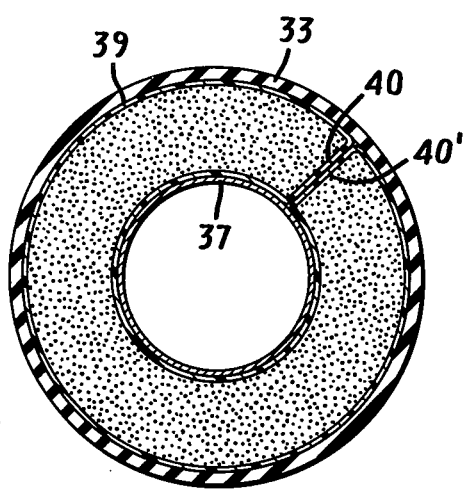
FIG. 4 is a circumferential section view along the line IV—IV of FIG. 3, on a smaller scale, showing the combination of the tire and its wheel rim with a bag containing particles in accordance with the invention.

The assembly shown in FIGS. 3 and 4 comprises a rim 31 having a circular groove 32 intended to facilitate the mounting of the tire 33. This groove 32 is adjacent to that one of the flanges of the rim 31 which is intended to be mounted on the outside with respect to the vehicle. The groove 32, after the beads 34 and 35 of the tire have been put in place, is closed, for instance, by means of a ring 36 which forms an axial extension of the rim well 37 and serves as airtight seat for the outer bead 35 of the tire. An inflation valve, not shown, is provided in the outer sidewall of the groove 32. In accordance with the invention, the tire cavity contains a filling of solid particles such as defined above, enclosed in a bag 36 of toroidal shape (See FIG. 4) of a length such that its ends 40, 40' are adjacent to each other within the tire cavity. The wall of this bag is of very small thickness, of the order of 40μ; for the clarity of the drawing this wall has been shown in relatively large thickness.

Figure 5:
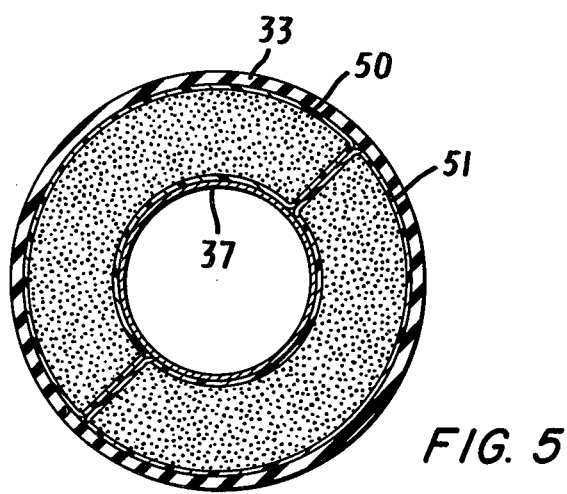
FIG. 5 is a circumferential section view of a mounted tire containing two bags instead of one.

In the variant shown in FIG. 5, two bags 50, 51 adjacent to each other have been used instead of a single bag as in the case of FIG. 4.

It goes without saying, that the invention also extends to the use of bags which are juxtaposed either in radial direction or in circumferential direction or in both directions of the tire at the same time.

In all of the above examples, the products designated below by their trade name can be used to form the cellular particles:

| TRADE NAME | FOAM OF | MANUFACTURER |
| --- | --- | --- |
| VINYLCEL | Cross linked rigid polyvinyl chloride | Johns-Manville |
| ETHAFOAM | Polyethylene | Dow Chemical |
| NEOPOLEN | Cross linked polyethylene | B.A.S.F. |
| MINICEL PPF | Polypropylene | Haveg Industries Inc. |
| STYROPOR P | Polystyrene | B.A.S.F. |
| STYROCELL | Polystyrene | Shell |
| AFCOLENE | Polystyrene | Rhone-Progil |
| STYROPOR H | Poly (styrene acrylonitrile) | B.A.S.F. |
| NEOPRENE WRT | Polychloroprene | DuPont deNemours |
| CARIFLEX 1502 | Styrene-butadiene | Shell |
| HYCAR 1001 | Nitrile-butadiene | B.F. Goodrich |
| CARADOL | Flexible polyurethane | Shell |
| QUADROL | Semi-rigid polyurethane | Ugine-Kuhlmann |
| EKANATE | Rigid polyurethane | Ugine-Kuhlmann |
| LILENE | — | Ugine-Kuhlmann |
| ESTAFOAM | Polyester | Vanguard Products |
| BRL 2759 | Phenol resin | Union Carbide |
| ECCOFOAM EFB | Epoxy resin | Emerson & Cuming |
| ISOCHAUM | Urea-formaldehyde resin | B.A.S.F. |
| VESPEL | Polyimide | DuPont deNemours |
| KINEL | Polyimide | DuPont deNemours |
| ECN Foamed Nylon | Polyamide | DuPont deNemours |
| VITON A | Fluorinated polymer | DuPont deNemours |
| MAKROLON | Polycarbonate | Bayer |

-continued

| TRADE NAME | FOAM OF | MANUFACTURER |
| --- | --- | --- |
| LEXAN | Polycarbonate | General Electric Corp. |
| POLECTON | Polyvinyl carbazole | GAF Corporation |
| LUVICAN M150 | Polyvinyl carbazole | B.A.S.F. |
| KAYFAX | Pyranyl | I.C.I. American Inc. |
| NORYL | Phenylene polyoxide | General Electric Corp. |
| RTV 7 | silicone | General Electric Corp. |
| I.C.B. 3400 | Refractory material | IPSEN Industries Inc. |

The cellulose acetate form produced by the Strux Corporation, the polyvinyl alcohol and formaldehyde foam obtained from ELVANOL 73,125 manufactured by DuPont deNemours and the aqueous formaldehyde and polysulfone foam, described in Netherlands Pat. No. 66,03273, etc., are also suitable.

What is claimed is:

1. A tire mounted on a wheel rim so as to form a tire cavity having an inflation valve and a separate particle introducing orifice provided with a plug, said tire cavity being filled at least partially with solid lightweight discrete particles of cellular material having a very low apparent density of less than about 100g./dm$^3$ but resistant to stresses due to travel, said particles bearing a lubricant which is inert with respect to the materials present in the tire cavity and being free to move relative to one another with low friction and low generation of heat when they have to cushion the tire after a puncture of the tire cavity and plug the puncture hole, said solid particles having been introduced into the tire cavity in an airstream by suction by means on the one hand of a tube, one of the ends of which was connected to the particle introducing orifice of the tire cavity and the other end extended into a receptacle containing said solid particles, and on the other hand by a vacuum-producing device mounted on the inflation valve of the tire cavity.

2. The tire according to claim 1 wherein the tire contains an inner tube.

3. The tire according to claim 1 wherein the tire is a tubeless tire.

4. The tire according to claim 1 wherein the lubricant has been added to the particles after the particles were introduced into the tire cavity.

5. The tire according to claim 1 wherein the lubricant has been added to the particles before the particles were introduced into the tire cavity.

6. A tire mounted on a wheel rim so as to form a tire cavity having an inflation valve and a separate particle introducing orifice provided with a plug, said tire cavity being filled at least partially with solid lightweight discrete particles of cellular material having a very low apparent density of less than about 100g./dm$^3$ but resistant to stresses due to travel, said particles bearing a lubricant which is inert with respect to the materials present in the tire cavity and being free to move relative to one another with low friction and low generation of heat when they have to cushion the tire after a puncture of the tire cavity and plug the puncture hole, said particles having been introduced into the tire cavity in an airstream by causing air pressure to act on a supply of said particles contained in an airtight enclosure connected by a tube to the particle introducing orifice of the tire cavity, the inflation valve of the tire cavity having been kept open during said operation.

7. The tire according to claim 6 wherein the tire contains an inner tube.

8. The tire according to claim 6 wherein the tire is a tubeless tire.

9. The tire according to claim 6 wherein the lubricant has been added to the particles after the particles were introduced into the tire cavity.

10. The tire according to claim 6 wherein the lubricant has been added to the particles before the particles were introduced into the tire cavity.

* * * * *